(12) United States Patent
Mackie

(10) Patent No.: US 7,734,122 B1
(45) Date of Patent: Jun. 8, 2010

(54) MULTIMODE INTERFERENCE DEVICE WITH SIDE INPUT/OUTPUT PORTS

(75) Inventor: David M. Mackie, College Park, MD (US)

(73) Assignee: The United States of Americas as represented by the Secretary of the Army, Washington, DC (US)

( * ) Notice: Subject to any disclaimer, the term of this patent is extended or adjusted under 35 U.S.C. 154(b) by 62 days.

(21) Appl. No.: 11/363,997

(22) Filed: Mar. 1, 2006

(51) Int. Cl.
*G02B 6/12* (2006.01)
*G02B 6/26* (2006.01)

(52) U.S. Cl. .......................... 385/14; 385/15
(58) Field of Classification Search ................. 385/14, 385/15, 27–31, 39, 45, 46; 359/557
See application file for complete search history.

(56) References Cited

U.S. PATENT DOCUMENTS

| | | | |
|---|---|---|---|
| 5,640,474 A | 6/1997 | Tayag | |
| 5,689,597 A * | 11/1997 | Besse | 385/39 |
| 5,838,842 A | 11/1998 | Mackie | |
| 5,852,691 A | 12/1998 | Mackie | |
| 5,862,288 A | 1/1999 | Tayag et al. | |
| 6,178,276 B1 | 1/2001 | Mackie | |
| 6,400,490 B1 * | 6/2002 | Hosoi | 359/254 |
| 6,996,302 B2 * | 2/2006 | Hamada | 385/14 |
| 7,035,494 B1 * | 4/2006 | Mackie | 385/15 |
| 2003/0219188 A1 * | 11/2003 | Doi et al. | 385/3 |

OTHER PUBLICATIONS

Levy et al. "A New Design for Ultracompact Multimode Interference-Based 2×2 Couplers". IEEE Photonics Technology Letters, vol. 10, No. 1, Jan. 1998.*
Soldano, L. et al., "Optical Multi-Mode Interference Devices Based on Self-Imaging: Principles and Applications," Journal of Lightwave Technology, vol. 13, No. 4, pp. 615-627, Apr. 1995.
Lee, B. et al., "Integrated-optic, Lossless Beamsplitters" Proceedings of SPIE, vol. 4112, pp. 101-108, Jul. 2000.
Paiam, M.R. et al., "Compact Planar 980/1550-nm Wavelength Multi-Demultiplexer Based on Multimode Interference," IEEE Photonics Technology Letters, vol. 7, No. 10, pp. 1180-1182, Oct. 1995.
Kuykendall, D. et al., "Wavelength Division Multiplexing Coupler Based on Talbot Self-Imaging in Planar Optical Waveguides," Proceedings of the National Conference on Undergraduate Research, Apr. 1997.
Li, B. et al., "Low-Loss 1×2 Multimode Interference Wavelength Demultiplexer in Silicon-Germanium Alloy," IEEE Photonics Technology Letters, vol. 11, No. 5, pp. 575-577, May 1999.

(Continued)

*Primary Examiner*—Charlie Peng
*Assistant Examiner*—Mary A El Shammaa
(74) *Attorney, Agent, or Firm*—William V. Adams; Guy M. Miller; Alan I. Kalb

(57) ABSTRACT

A multimode interference device and a method of configuring the same comprises a multimode interference region having a major axis; and a plurality of ports connected to a side portion of the multimode interference region, wherein the side portion is positioned in a direction other than perpendicular to the major axis.

8 Claims, 13 Drawing Sheets

OTHER PUBLICATIONS

Mackie, D.M., et al., "Polarization separation/combination based on self-imaging," Optical Engineering, vol. 40, No. 10, pp. 2265-2272, Oct. 2001.

Lin, K. et al., "Guided-wave 1.3/1.55 µm wavelength division multiplexer based on multimode interference," Electronics Letters, vol. 32, No. 14, pp. 1259-1261, Jul. 4, 1996.

Paiam, M.R. et al., "Polarisation-insensitive 980/1550 nm wavelength (de)multiplexer using MMI couplers," Electronics Letters, vol. 33, No. 14, pp. 1219-1220, Jul. 3, 1997.

Li, B. et al., "Guided-wave $Si_{1-x}Ge_x$/Si wavelength demultiplexer based on multimode interference," Infrared Physics & Technology, vol. 39, pp. 61-67, 1998.

Chuang, W. et al., "Integrated-Optics Multimode-Interference Wavelength Division Multiplexer for Optical Communication," Fiber and Integrated Optics, vol. 18, pp. 93-104, 1999.

Fish, Ga., et al., "Compact InGaAsP/InP 1×2 optical switch based on carrier induced suppression of modal interference," Electron. Lett. 33, No. 22, 1898-1899, Oct. 1997.

Zhao, P., et al., "Novel multimode coupler switch," Microwave and Optical Technol. Lett., 17, No. 1, 1-7, Jan. 1998.

El-Refaei H.H., et al., "Design of strip-loaded weak-guiding multimode interference structure for an optical router," IEEE J. Quantum Electron 34, No. 12, 2286-2290, Dec. 1998.

Nagai, S., et al., "InGaAsP/InP multi-mode interference photonic switches for monolithic photonic integrated circuits," Jpn. J. Appl. Phys. 38, Pt. 1, No. 2B, 1269-1272 (1999).

Nagai, S., et al., "Multimode interference photonic switches (MIPS)," J. Lightwave Technol. 20, No. 4, 675-681, Apr. 2002.

Chang, W.C., et al., "A novel multimode interference optoelectronic and gate with partial index-modulation regions," in 2001 International Symposium on Electron Devices for Microwave and Optoelectronic Applications. EDMO 2001, Piscataway, NJ, 335-337, 2001 (abstract).

Tsao, S.L., et al., "An SOI X-crossing optical switch," in Solar and Switching Materials, Proc. SPIE 4458, 269-277, 2001.

Tsao, S.L., et al., "A novel wavelength switch with an 2×2 MMI SOI photonic crystal inside," in Materials and Devices for Photonic Crystals II, Proc. SPIE 4453, 162-169, 2001.

Lien, C.H., et al., "A compact photonic switch based on multimode interference with partial index-modulation regions," Microwave and Optical Technol. Lett. 33, No. 3, 174-175, May 5, 2002.

Ishida, K., et al., "InGaAsP/InP optical switches using carrier induced refractive index change," Appl. Phys. Lett. 50, No. 3, 141-142, Jan. 1987.

Ito, F., et al., "A carrier injection type optical switch in GaAs using free carrier plasma dispersion with wavelength range from 1.06 to 1.55 µm," IEEE J. Quantum Electron. 25, No. 7, 1677-1681, Jul. 1989.

Campbell, J.C., et al., "Electro-optic multimode waveguide modulator or switch," J. Appl. Phys. 50, No. 10, 6149-6154, Oct. 1979.

Earnshaw, M.P., et al., "Semiconductor space switches based on multimode interference couplers," J. Lightwave Technol. 20, No. 4, 643-650, Apr. 2002.

Mackie, D.M., et al., "Slotted multimode-interference devices," Applied Optics, vol. 43, No. 26, 6609-6619, Dec. 20, 2004.

Levy, D.S., et al., "Fabrication of Ultracompact 3-dB 2×2 MMI Power Splitters," IEEE Photon. Technol. Lett. vol. 11, No. 8, 1009-1011, Aug. 1999.

Levy, D.S., et al., "Length Reduction of Tapered N×N MMI Devices," IEEE Phot. Technol. Lett. vol. 10, No. 6, 830-832, Jun. 1998.

Levy, D.S., et al., "A New Design for Ultracompact Multimode Interference-Based 2×2 Couplers," IEEE Photon. Technol. Lett. vol. 10, No. 1, 96-98, Jan. 1998.

Mackie, D.M., et al., "Form-birefringence in waveguide devices," OSA Trends in Optics and Photonics (TOPS) vol. 78, Integrated Photonics Research, OSA Technical Digest, Meeting Edition (Optical Society of America, Washington DC, 2002), pp. IThI6-1-IThI6-3.

Bachmann, M., et al "General self-imaging properties in N×N multimode interference couplers including phase relations," Appl. Opt. vol. 33, No. 18, 3905-3911, Jun. 20, 1994.

Kunkee, E.T., et al., "Simultaneous Optical Amplification and Splitting for Lower Noise and Higher Gain Microwave Signal Distribution," SPIE vol. 3160, 89-96, 1997.

Harrison, L.J., et al., "Monolithic Integration of 1.3-µm Stark-Ladder Electroabsorption Waveguide Modulators with Multimode-Interference Splitters," IEEE Photon. Technol. Lett. vol. 12, No. 6, 657-659, Jun. 2000.

Ma, H. et al., "Compact and Economical MMI Optical Power Splitter for Optical Communication," Chinese J. Semicond. 21, No. 10, 966-969, Oct. 2000.

Mackie, D.M., et al., "Integrated, Optically-Pumped. Lossless Splitter: Progress and Challenges," In Proc. 22nd Army Science Conference, Baltimore, MD, pp. 51-52, Dec. 2000.

Kim, G., et al., "A Multimode-Interferenced Electrooptic TE/TM Mode Splitter," In Tech. Dig. Pacific Rim Conf. on Lasers and Eletro-Opitcs (CLEO/Pacific Rim '99), pp. 565-566, 1999.

Rahman, B.M., et al., "Design of optical polarization splitters in a single-section deeply etched MMI waveguide," App;. Phys. B 73, 613-618, Oct. 2001.

Tayag, T.J., et al., "A Manufacturable Technique for Implementing Low-Loss Self-Imaging Waveguide Beamsplitters," IEEE Photon Technol. Lett. vol. 7, No. 8, 896-898, Aug. 1995.

\* cited by examiner

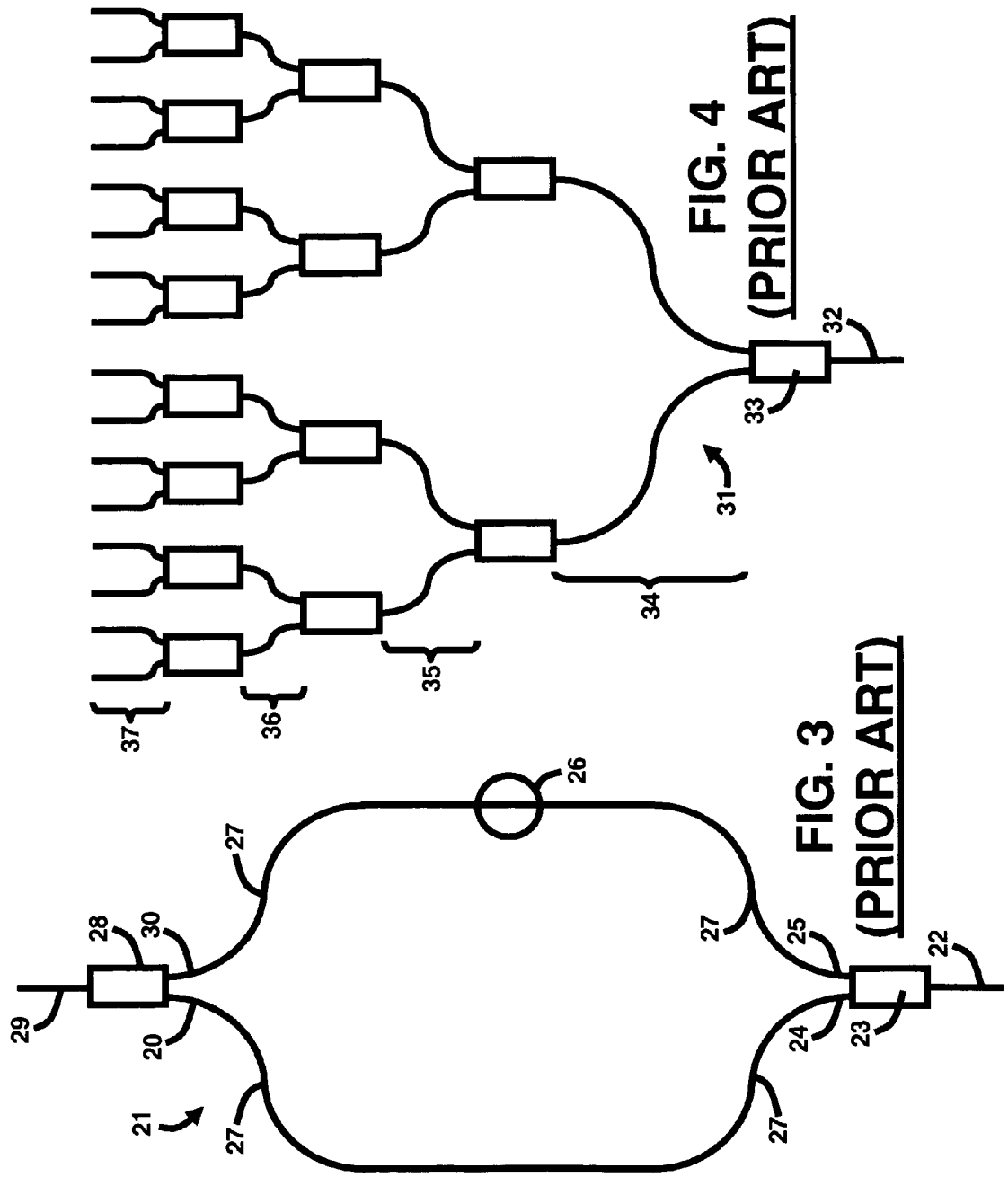

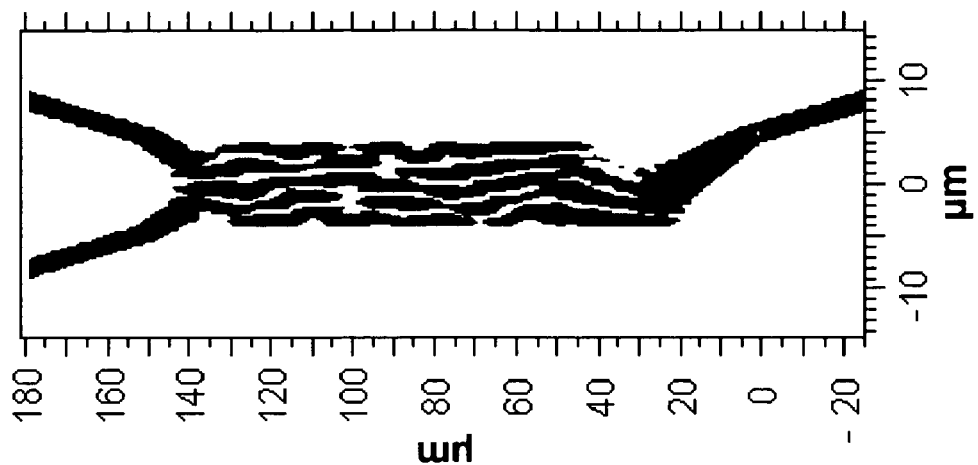
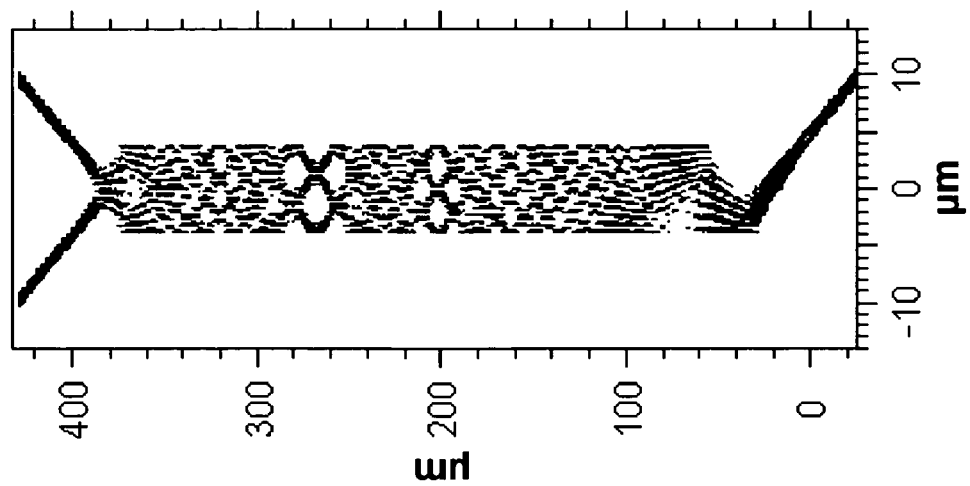

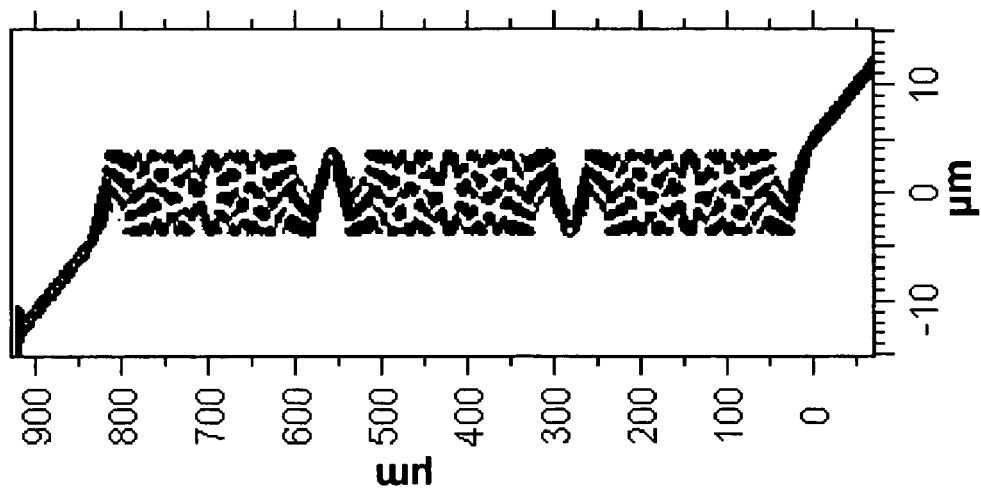
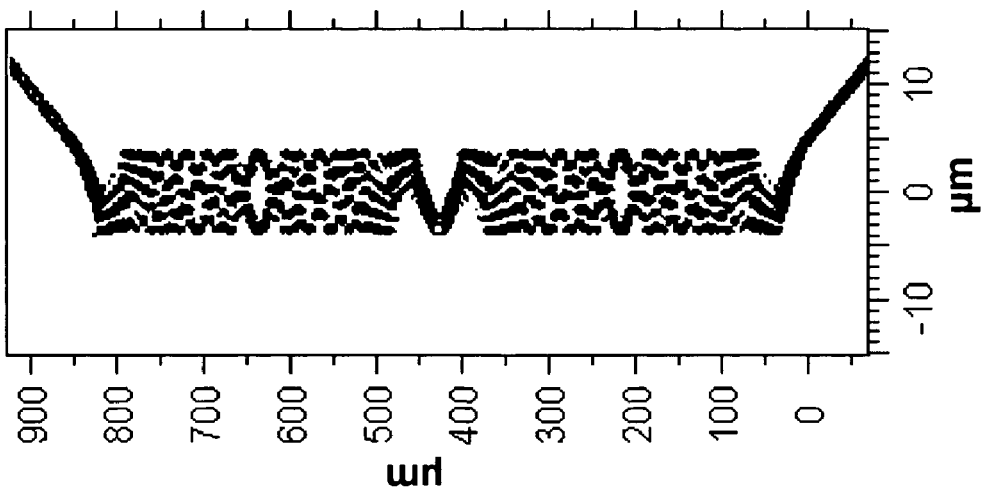

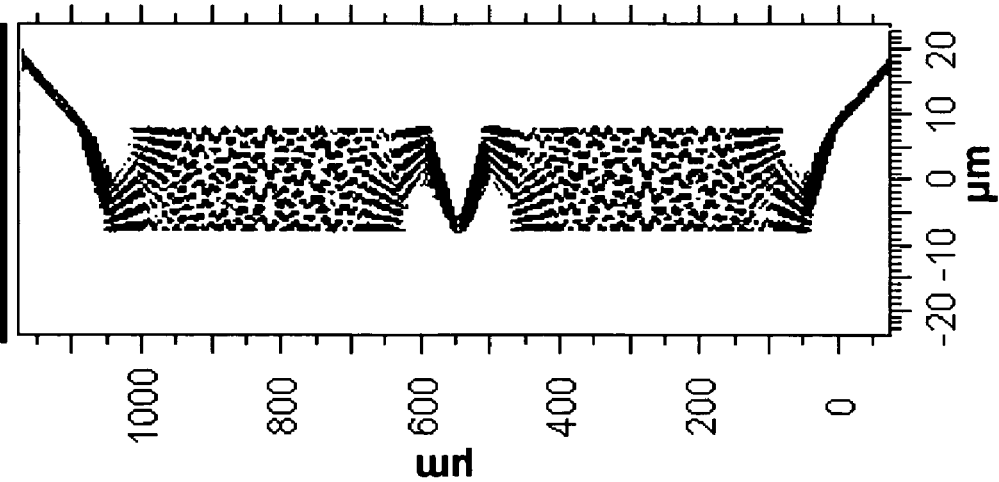
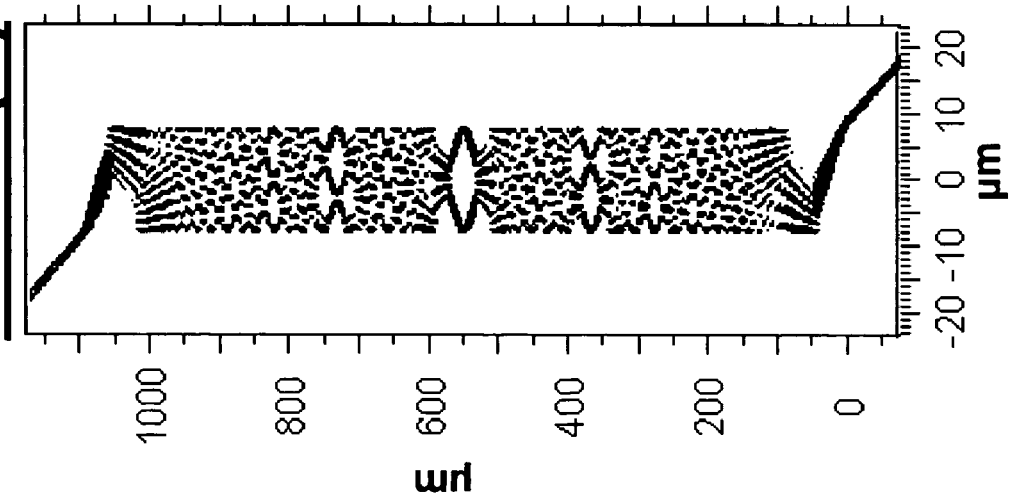
FIG. 16(A)
FIG. 16(B)

MULTIMODE INTERFERENCE DEVICE WITH SIDE INPUT/OUTPUT PORTS

GOVERNMENT INTEREST

The embodiments of the invention described herein may be manufactured, used, and/or licensed by or for the United States Government.

BACKGROUND OF THE INVENTION

1. Field of the Invention

The embodiments of the invention generally relate to integrated-optic communications, and more particularly to a multimode interference device for use in telecommunications, sensing, and related applications.

2. Description of the Related Art

Multimode interference (MMI) devices are useful for power splitting and for the separation/combination of wavelengths or polarizations (SCWP), usually in integrated-optic (IO) systems. A typical MMI device consists of a MMI region separated by an input port and an output port. The ports are where input/output guides connect to the MMI region. Typically, in conventional MMI devices, the input and output guides only connect to the ends of the MMI region; i.e., they are end-ported.

Power splitting devices are required for many signal distribution and sensing applications. As another example, wavelength separation/combination devices for 1.31 μm and 1.55 μm are required in the field of fiber optic communications to take advantage of embedded fiber optic systems at 1.31 μm and proceed with the deployment of the lower loss 1.55 μm systems. Wavelength separation/combination devices are also required for optical pumping of a 1.55 μm signal with a 0.98 μm pump. Commercially available devices typically rely on bulk optical filters. In another example, polarization separation/combination devices are required for various IO and fiber optic sensing systems, such as optical gyroscopes and structural stress sensors. Basically, the self-imaging effect is a general property of light. Thus, MMI devices do not have to be implemented in IO systems.

FIG. 1 illustrates a schematic top-down view of a conventional MMI-based separation/combination of wavelength/polarization (SCWP) device 1 consisting of a straight input guide 2 (which may be the output of a previous device) connected to an end-ported MMI region 3, which is connected to (1) a first straight end-ported output guide 4 for a first polarization or wavelength and (2) a second straight end-ported output guide 5 for a second polarization or wavelength.

The guides 2, 4, 5 and MMI region 3 may be defined using a variety of methods that are well-established in the prior art. The entire device 1 is nearly always single mode in the transverse (out of the paper) direction. The input/output guides 2, 4, 5 are commonly, but not always, single mode in the lateral (horizontal) direction also. Often the input/output guides 2, 4, 5 are expanded as they near the MMI region 3 because it has been shown that wider ports improve device performance. However, the expansion is typically performed adiabatically (i.e., in a gradual way) so that only the lowest order mode is being propagated. The MMI region 3, in contrast, supports many lateral modes. An input signal excites these modes, which propagate with different phase velocities down the length of the MMI region 3, and become de-phased. A self-image of the input to the MMI region 3 forms when the superposition of the modes in the image plane again matches the original modal distribution at the input plane. This condition occurs at planes where the accumulated phase differences among the excited modes are integral multiples of $2\pi$, which allows the excited modes to constructively interfere and reproduce the input's modal distribution. The propagation distance at which this occurs is known as the self-image length.

The self-image length depends upon the polarization and the wavelength. A useful property of the self-imaging effect is that a lateral displacement of the input to the MMI region 3 along the object plane results in a corresponding displacement of the self-image along the image plane. This self-image displacement is antisymmetrical for the first self-image length (crossed). The second self-image is antisymmetrical to the first self-image, and thus symmetrically displaced relative to the input (barred). This continues, with odd-numbered self-images being antisymmetrically displaced (crossed), and even-numbered self-images being symmetrically displaced (barred). It has been previously shown that the dimensions of the MMI region 3 can be set such that the modes constructively interfere at the end of the region, forming a self-image of the transverse electric (TE) (or $\lambda_1$) input signal at one output port and transverse magnetic (TM) (or $\lambda_2$) at the other output port. Thus, the device 1 can separate two polarizations (or wavelengths) from one input guide 2 into two output guides 4, 5, each containing a different polarization (or wavelength). The device 1 can also work in reverse as a combiner.

FIG. 2 illustrates a schematic top-down view of a conventional MMI-based 1×2 power splitting device 11 consisting of a straight input guide 12 (which may be the output of a previous device) connected to an end-ported MMI region 13, which is connected to a first pair of straight output guides 14, 15, which connects to two first curving guides 16 respectively connecting to two second curving guides 17. A second pair of straight output guides 18, 19 (which may serve as inputs for subsequent devices) is also included connected to the second curving guides 17.

This device 11 uses the property of the self-imaging effect that multiple self-images of the input are formed at proper integer fractions of the self-imaging length. For an MMI region 13 with its length set to half of the self-image length, the output plane contains two self-images of the input. Each of the two output guides 14, 15 contains half of the power of the input guide 12 (ignoring the slight losses that occur). Typically, power splitters are combined with S-bends (i.e., first curving guides 16 and second curving guides 17) on the output guides 14, 15 as shown in FIG. 2, in order to laterally separate the outputs. The device 11 can also work in reverse as a power combiner, provided that the two input signals are coherent. For maximum recombination, the two input signals should be in phase.

Power splitters/combiners are used in a variety of applications. Many sensing and signal control architectures use a Mach-Zehnder Interferometer (MZI), or variations thereof. FIG. 3 schematically shows a conventional MZI 21, which consists of a straight input guide 22 operatively connected to an end-ported MMI 1×2 power splitter 23, which connects to four S-bend guides 27 (with individual parts not shown). A first straight guide 24 serving as a reference leg and a second straight guide 25 serving as a sensing leg are operatively connected to the MMI 1×2 power splitter 23. Connected to the second straight guide (sensing leg) 25 is a phase-changing mechanism 26 that changes the phase of the signal in the second straight guide (sensing leg) 25. An end-ported MMI 1×2 power combiner 28 is also included located at an opposite end from the MMI 1×2 power splitter 23 in the MZI 21. Two of the S-bend guides 27 serve as input guides 20, 30 into the MMI 1×2 power combiner 28, which then terminates with a straight output guide 29 extending out of the end of the MMI 1×2 power combiner 28. The output power from the power combiner varies as the phase of the signal of one port changes relative to the signal of the other port.

For signal distribution applications, 1×2 power splitters are often used in series to create 1×2 splitting, then 1×4 splitting, then 1×8 splitting, then 1×16 splitting, and so on. This is sometimes referred to as cascading 1×2 splitters. Such a structure is referred to as a 1×N power splitter. The schematic for such a structure is shown in FIG. 4, which is depicted as an end-ported MMI-based 1×16 power splitter 31 consisting of a straight input guide 32 connecting to one of fifteen end-ported MMI 1×2 power splitters 33. The MMI 1×2 power splitters 33 are configured in four rows of 1, 2, 4, and 8 power splitters in the respective rows. A row of two intermediate S-bend guides 34 (with the individual parts not shown) connects the first row of MMI 1×2 power splitters 33 to the second row of 1×2 power splitters 33. A row of four intermediate S-bend guides 35 (with the individual parts not shown) connects the second row of MMI 1×2 power splitters 33 to the third row of 1×2 power splitters 33. A row of eight intermediate S-bend guides 36 (with the individual parts not shown) connects the third row of MMI 1×2 power splitters 33 to the fourth row of 1×2 power splitters 33. Additionally, a row of sixteen output S-bend guides 37 (with the individual parts not shown) also connects to the fourth row of MMI 1×2 power splitters 33.

The conventional MMI-based power splitting and SCWP devices that have been previously described generally outperform competing conventional techniques. Like competing conventional techniques, however, their input/output ports are initially close enough in the lateral direction to allow the unwanted transfer of an input signal laterally from one guide to the other, as the signal is guided toward or away from the MMI region. Also, laterally separating the guides requires bends, which cause unwanted signal loss, both from mode mismatch at guide boundaries and from radiative effects of curvature. For 1×N power splitters, the bends in the guides that are necessary to separate the intermediate outputs often cause unwanted nonuniformity in the powers at the final outputs.

FIG. 5 shows a schematic top view of a conventional end-ported slotted MMI-based switch 41 consisting of a straight input guide 42 connecting to an end-ported MMI region 43, which then connects to (1) a first straight output guide 44 for the "slot off" condition and (2) a second straight output guide 45 for the "slot on" condition. Furthermore, a slot 46 is configured in the MMI region 43, wherein the slot 46 can be turned on and off in the following manner. In the "slot off" condition, light exits the MMI region 43 on the opposite lateral side 44 from the input guide 42. In the "slot on" condition, light exits the MMI region 43 on the same lateral side (i.e., through the output 45) as the input guide 42.

Unfortunately, there tends to be three weaknesses to this conventional design. First, the outputs 44, 45 must be subsequently separated by S-bends, which are not shown. Second, the slot width is constrained by the presence of the input/output guides 42, 44, 45 along the ends of the MMI region 43. Making the slot too wide, so that it overlaps with the input/output ports, lessens the throughput and increases the crosstalk, both of which are undesirable. Third, the ideal device length is slightly different for the "slot on" and "slot off" conditions. The length must be set to a compromise length, which compromises the overall performance of the switch 41.

Additionally, angling the input/output guides of conventional MMI devices has been previously suggested, but only in the context of end-porting. For end-porting, angled input/output guides degrade the performance unless the MMI region is non-rectangular (e.g., bow-tie shaped), which introduces additional difficulties in design and fabrication. Thus, there remains a need to improve the performance of the conventional MMI devices by increasing the lateral separation of the ports and by separating the guides without using bends.

SUMMARY OF THE INVENTION

In view of the foregoing, an embodiment of the invention provides a multimode interference device comprising a multimode interference region having a longitudinal axis and at least one side portion that is substantially parallel to the longitudinal axis; and a plurality of ports connected to the at least one side portion of the multimode interference region. Preferably, the plurality of ports comprise at least one input port adapted to receive any of optical power, optic wavelengths, and electromagnetic polarizations; and at least one output port adapted to dispatch any of optical power, optic wavelengths, and electromagnetic polarizations. Moreover, the multimode interference region is preferably adapted to direct any of optical power, optic wavelengths, and electromagnetic polarizations from the at least one input port into the at least one output port. Furthermore, the plurality of ports may be positioned at an acute angle with respect to the longitudinal axis of the multimode interference region.

The multimode interference device may further comprise a phase-changing device connected to one of the at least one input port and the at least one output port. Additionally, each of the plurality of ports may be linearly configured. Also, the at least one input port is preferably operatively connected to the at least one output port. The plurality of ports may be offset relative to one another. Alternatively, the plurality of ports may be offset relative to an end portion of the multimode interference region, wherein the end portion of the multimode interference region is substantially transverse to the longitudinal axis of the multimode interference region. Furthermore, the multimode interference region may comprise at least one subregion having an effective refractive index running longitudinally within the multimode interference region, wherein the at least one subregion preferably comprises a slot.

Another aspect of the invention provides a multimode interference device comprising a multimode interference region having a major axis; and a plurality of ports connected to a side portion of the multimode interference region, wherein the side portion is positioned in a direction other than perpendicular to the major axis.

Another embodiment of the invention provides a method of configuring a multimode interference device, wherein the method comprises forming a multimode interference region having a longitudinal axis and at least one side portion that is substantially parallel to the longitudinal axis; and positioning a plurality of ports onto the at least one side portion of the multimode interference region. Preferably, the plurality of ports comprise at least one input port adapted to receive any of optical power, optic wavelengths, and electromagnetic polarizations; and at least one output port adapted to dispatch any of optical power, optic wavelengths, and electromagnetic polarizations. Moreover, the multimode interference region is preferably adapted to direct any of optical power, optic wavelengths, and electromagnetic polarizations from the at least one input port into the at least one output port.

Additionally, the plurality of ports may be positioned at an acute angle with respect to the longitudinal axis of the multimode interference region. The method may further comprise connecting a phase-changing device to one of the at least one input port and the at least one output port. Also, each of the plurality of ports may be linearly configured. The method may further comprise connecting the at least one input port to the at least one output port. Furthermore, the method may comprise offsetting the plurality of ports relative to one another. Alternatively, the method may further comprise offsetting the plurality of ports relative to an end portion of the multimode interference region, wherein the end portion of the multimode interference region is substantially transverse to the longitudinal axis of the multimode interference region. The multimode interference region may comprise at least one subregion having an effective refractive index running longitudinally within the multimode interference region. Moreover, the method may further comprise configuring the at least one subregion with a slot.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 3 illustrates a schematic diagram of a conventional MMI-based Mach-Zehnder interferometer device;

FIG. 4 illustrates a schematic diagram of a conventional MMI-based 1×16 power splitter device;

FIG. 7(A) illustrates a graph of the electromagnetic (EM) field evolution through a side-ported MMI-based 1×2 power splitter device with n=3, air boundaries, $\lambda=1$ μm, MMI width=8 μm, and input/output guide width=2 μm according to an embodiment of the invention;

FIG. 7(B) illustrates a graph of the EM field evolution through a side-ported MMI-based 1×2 power splitter for a device with n=1.5, air boundaries, $\lambda=1.5$ μm, MMI width=8 μm, and input/output guide width=2 μm according to an embodiment of the invention;

FIG. 14(A) illustrates a graph of the EM field evolution through a side-ported MMI-based SCWP device with n=1.5, air boundaries, $\lambda=1.5$ μm, MMI width=8 μm, d=14 μm, input/output guide width=2 μm, and $\lambda=0.98$ μm for a pump according to an embodiment of the invention;

FIG. 14(B) illustrates a graph of the EM field evolution through a side-ported MMI-based SCWP device with n=1.5, air boundaries, $\lambda=1.5$ μm, MMI width=8 μm, d=14 μm, input/output guide width=2 μm, and $\lambda=1.55$ μm for a signal according to an embodiment of the invention;

FIG. 16(A) illustrates a graph of the EM field evolution through a side-ported slotted MMI-based switch in the "slot off" condition with n=1.5 (including the slot), air boundaries, $\lambda=1.5$ μm, MMI width=16.1 μm, slot width=0.3 μm, d=8.7 μm, and input/output guide width=2 μm according to an embodiment of the invention;

FIG. 16(B) illustrates a graph of the EM field evolution through a side-ported slotted MMI-based switch in the "slot on" condition with n=1.5 (not including the slot), air boundaries, $\lambda=1.5$ μm, MMI width=16.1 μm, slot width=0.3 μm, d=8.7 μm, and input/output guide width=2 μm according to an embodiment of the invention.

DETAILED DESCRIPTION OF PREFERRED EMBODIMENTS OF THE INVENTION

Figure 1:
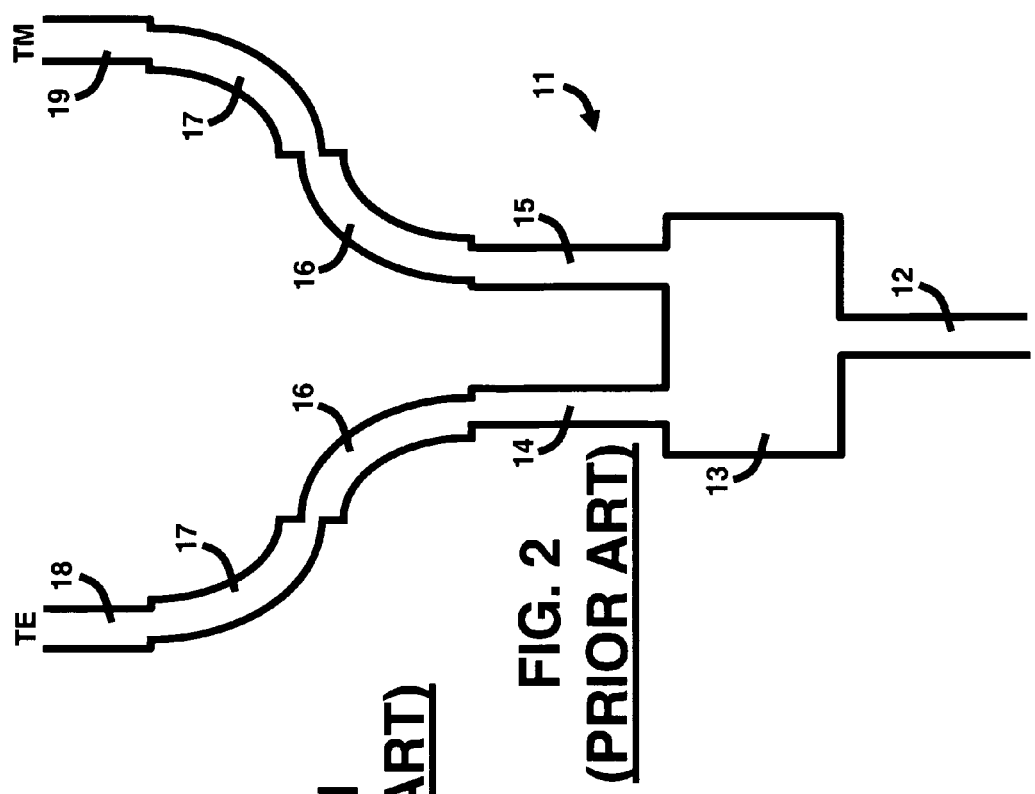
FIG. 1 illustrates a schematic diagram of a conventional MMI-based SCWP device.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need to improve the performance of the conventional MMI devices by increasing the lateral separation of the ports and by separating the guides without using bends. The embodiments of the invention achieve this by providing side-ported MMI-based devices.

Referring now to the drawings and more particularly to FIGS. 6 through 17 where similar reference characters denote corresponding features consistently throughout the figures, there are shown preferred embodiments of the invention.

Figure 6:
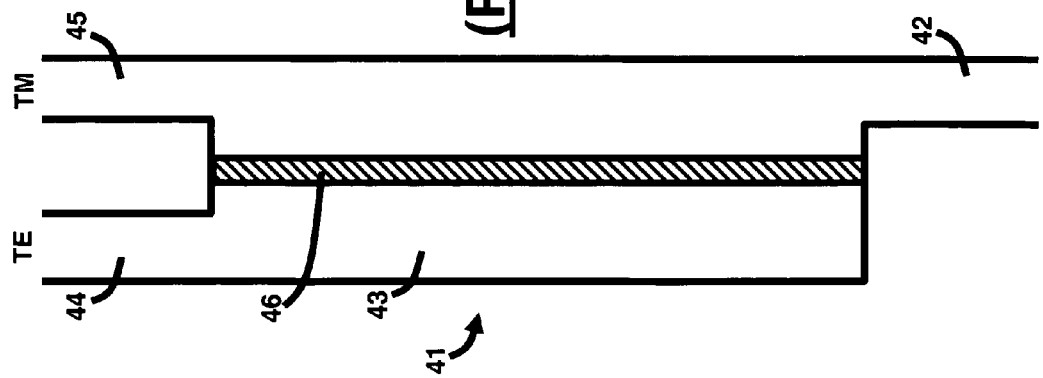
FIG. 6 illustrates a schematic diagram of a side-ported MMI-based 1×2 power splitter device according to an embodiment of the invention.

FIG. 6 illustrates a side-ported MMI-based 1×2 power splitter device 101 according to an embodiment of the invention, wherein the device 101 comprises a side-ported MMI region 103 connected to a generally straight input guide 102 (which may be the output of a previous device) configured at an acute angle A to the longitudinal axis of the MMI region 103 and connecting either partly or entirely to the lateral side 107 of the MMI region 103. Additionally, two generally straight output guides 104, 105 (which may serve as inputs for subsequent devices) are connected to the MMI region 103, wherein each of the output guides 104, 105 is configured at an acute angle A to the longitudinal axis of the MMI region 103 and connecting either partly or entirely to the lateral side 107 of the MMI region 103, and wherein one output guide (either 104 or 105) is preferably configured on each lateral side 107 of the MMI region 103, although, they could both be configured on only one side. While the MMI region 103 is shown as a rectangular-shaped configuration, those skilled in the art would readily understand that other non-rectangular configurations may be used in accordance with the embodiments of the invention.

For the purposes of the embodiments of the invention, the term "longitudinal axis" refers to the dominant or longest or major axis of a MMI region of a MMI-based device. Typically, this longitudinal axis runs substantially parallel to the overall direction of wave propagation through the MMI region. For example, in a rectangular-shaped configuration, the longitudinal axis refers to the axis running substantially parallel to the longest side of the rectangle. In a square-shaped configuration, because all four sides of the MMI region are equal, the longitudinal axis refers to the axis running substantially parallel to the overall direction of wave propagation through the MMI region. In a circular-shaped configuration, the longitudinal axis refers to the axis running substantially parallel to the overall direction of wave propagation through the MMI region. In an elliptical-shaped configuration, the longitudinal axis refers to the major axis of the elliptical-shaped MMI region. In all other configurations, the longitudinal axis generally refers to the dominant or longest or major axis of a MMI region, which runs substantially parallel to the overall direction of wave propagation through the MMI region.

According to the embodiments of the invention, side-porting includes two components: (1) placing the input and output ports 102, 104, 105, respectively, partially or entirely on the lateral sides 107 of the MMI region 103, rather than entirely on the device ends 106 as in the conventional structures, and (2) setting the input guides 102 and output guides 104, 105 at an acute angle (for example, angle A) to the longitudinal axis of the MMI region 103. The maximum useful value for angle A depends upon the fabrication and material parameters. Generally, the angle will not exceed 30 degrees even for high index contrasts. For the embodiments presented below, angles of approximately 10 degrees are assumed.

Prior to the development of the embodiments of the invention, it has been tacitly assumed by the industry that MMI devices would not work unless the input and output ports were positioned somewhere on, and entirely confined to, the ends of the MMI region (i.e., end-porting). Thus, side-porting as provided by the embodiments of the invention is a new concept for MMI-based devices, and has a number of advantages over the conventional techniques of end-porting. For example, in end-porting, the input/output ports generally must either be made narrow relative to the width of the MMI region (which reduces throughput) or else be separated laterally by only a small distance (which increases crosstalk or nonuniformity). Conversely, in side-porting, input/output ports 102, 104, 105, respectively, can instead be separated by the entire width of the MMI region 103, without regard to the width of the ports 102, 104, 105. Second, side-ported input/output guides 102, 104, 105 are geometrically straight, yet automatically separate laterally from one another, since they are naturally at opposite angles from the MMI longitudinal axis. Hence, there is no need for S-bends as prevalent in conventional structures.

Third, in side-porting, the ports 102, 104, 105 may be placed at different distances along the longitudinal axis of the MMI region 103. Hence, depending on the particular application, this can significantly shorten the overall length of some devices while still providing good performance, and can make possible entirely new types of devices. This degree of freedom has not been reported for end-porting techniques, thereby suggesting it not being possible in the conventional structures, and hence providing an unexpected benefit of side-porting according to the embodiments of the invention. Fourth, side-porting may be more compatible with some novel MMI designs than is end-porting. For instance, some slotted MMI designs may be limited or made more difficult to implement by end-porting due to spatial limitations on the device itself.

The embodiments of the invention, such as the device 101 shown in FIG. 6, were tested for throughput. The throughput of a MMI device is characterized by the power at the output port (or in the output waveguide) normalized by the power at the input port (or in the input waveguide). Ideally, one wants the throughput to be unity (i.e., 1.0), indicating that no power has been lost from the system due to the device in question. The calculations were based on the well-known beam propagation method (BPM) and the effective index method (EIM). The effective index of refraction of the waveguide (including the MMI region 103), n, was either 3 or 1.5, corresponding to GaAs or glass, respectively. The lateral index was 1, implying a pedestal etch. Devices configured with a slot, further described below, used a lowered effective index of refraction for the slot, $n_{slot}$. The wavelength, $\lambda$, varied from 0.98 μm to 1.55 μm, depending on the device and the application.

FIGS. 7(A) and 7(B) illustrate top views of the calculated EM field evolution through the side-ported MMI-based 1×2 power splitter device 101 of FIG. 6. FIG. 7(A) illustrates the results for a device with n=3, air boundaries, $\lambda$=1 μm, MMI width=8 μm, and input/output guide width=2 μm. FIG. 7(B) illustrates the results for a device with n=1.5, air boundaries, $\lambda$=1.5 μm, MMI width=8 μm, and input/output guide width=2 μm. The relative intensities are shown, on a scale of white (i.e., no shade) for zero intensity to black (i.e., shade) for maximum intensity. Both designs of FIGS. 7(A) and 7(B) achieved greater than 98% throughput and less than 1% nonuniformity. In this context, nonuniformity is the relative difference in throughput between outputs. Ideally a 1×2 power splitter should have 50% throughput in each output, giving 100% overall throughput and 0% nonuniformity. For 1×N splitters, nonuniformity is usually reported as the relative difference between the largest throughput and the smallest throughput of the N outputs.

The configurations shown in FIGS. 7(A) and 7(B) were each produced in only 30 minutes, which demonstrates the relative ease of designing optimum side-ported devices according to the embodiments of the invention. The stated performance was achieved with no parameter optimization except for the length. Typically, to optimize the performance of a conventional MMI power splitter, one has to vary a number of parameters such as the length, the port width, the S-bend radius, and the offset between incurving and outcurving parts of the S-bends. If the MMI region is non-rectangular, then still other parameters will need to be optimized. The significance of the performance achieved by the embodiments of the invention with no parameter optimization other than length is that the embodiments of the invention are easy to design. Furthermore, the embodiments of the invention may be fabricated using any one of a number of standard fabrication techniques in integrated photonics. As such, the side-porting of MMI devices is not dependent on any extravagant fabrication method, thereby allowing for an efficient and easy fabrication process.

Figure 2:
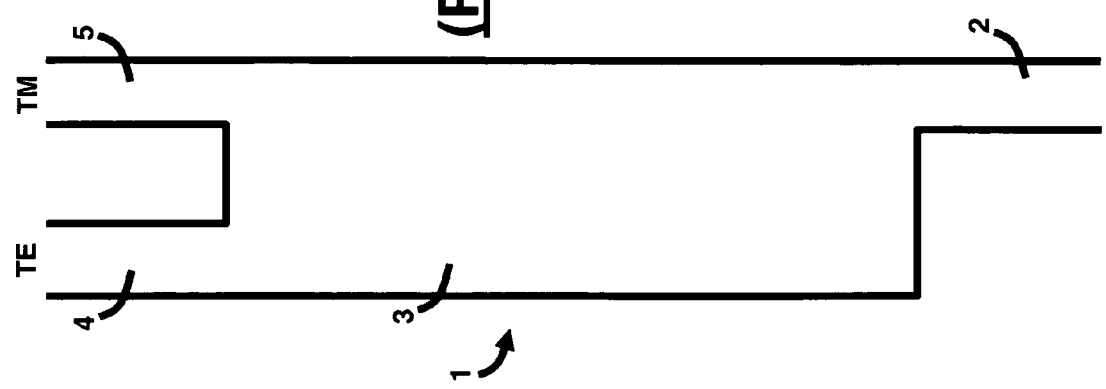
FIG. 2 illustrates a schematic diagram of a conventional MMI-based 1×2 power splitter device with S-bend guides on the outputs.
Figure 5:
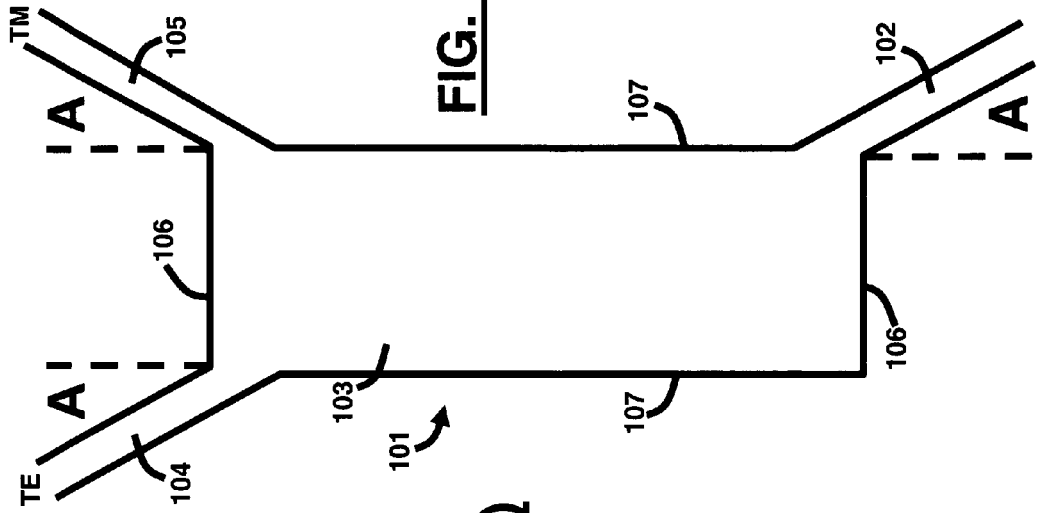
FIG. 5 illustrates a schematic diagram of a conventional end-ported slotted MMI-based switch.

As a comparison, similar types of calculations were made using the same parameters as for the devices shown in FIGS. 7(A) and 7(B), for conventional end-ported MMI-based 1×2 power splitters with non-slanted input/output guides. The inputs for the conventional devices were centered, as is standard practice in the industry. FIG. 2 illustrates an example of the type of conventional device tested, except that the (negative) effect of the S-bends was not taken into consideration for ease of testing and calculations. The optimal conventional designs achieved a 99% throughput and a 0.1% nonuniformity. Although these performance results are better than the above results for side-ported devices of FIGS. 7(A) and 7(B) according to the embodiments of the invention, it is well-known in the industry that S-bends are very detrimental to both throughput and nonuniformity. Thus, had the S-bends been accounted for in the calculations, then the performance of the conventional designs would undoubtedly have been reduced.

A more fair comparison is made by designing conventional end-ported MMI-based 1×2 power splitters with slanted input/output guides. Such devices would not require S-bends. In this case, the optimal conventional designs achieved only approximately 95% throughput and 1% nonuniformity. Thus, the design change from end-porting to side-porting significantly decreases the loss from 5% to less than 2%, and also decreases the nonuniformity.

Figure 8:
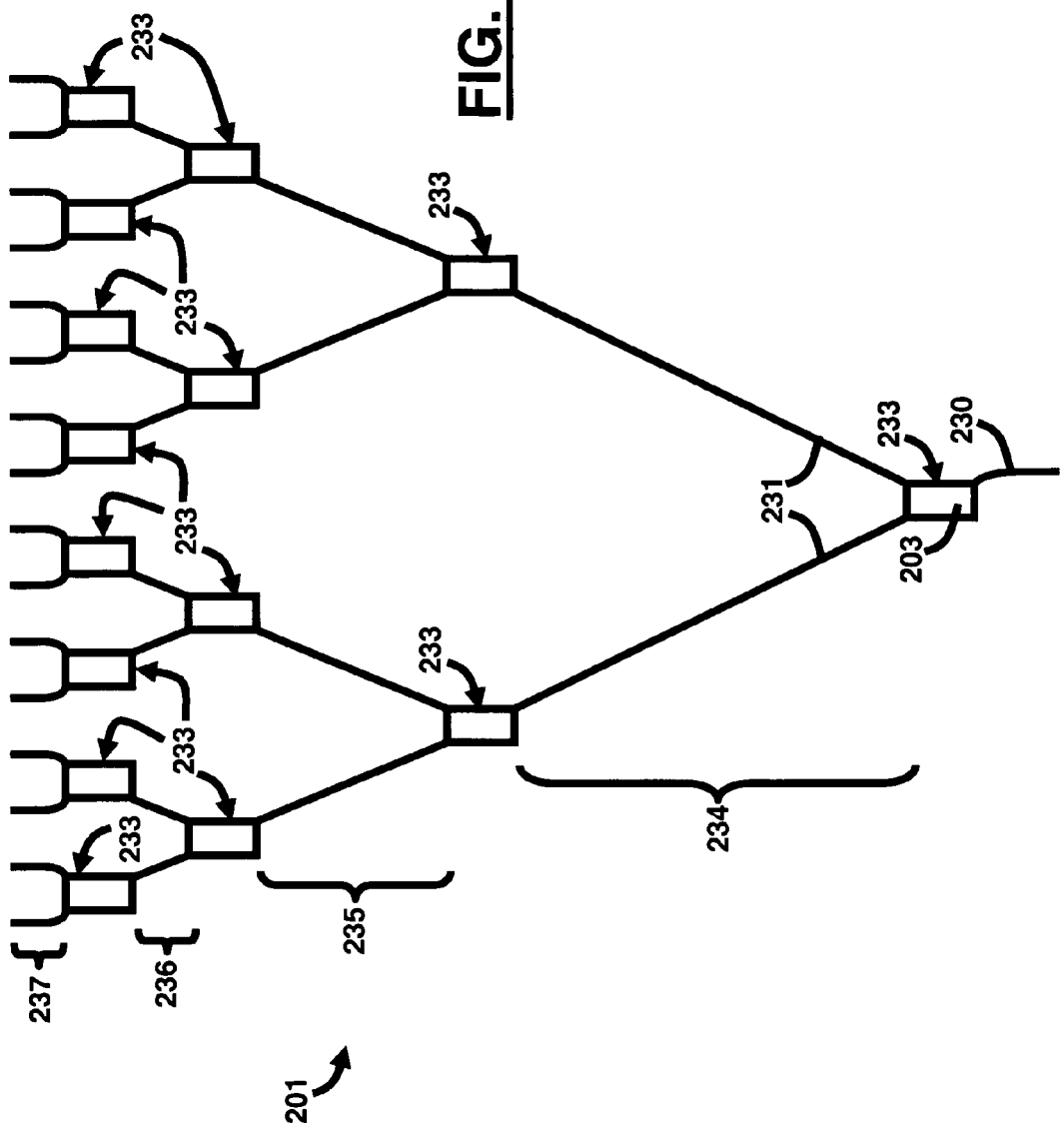
FIG. 8 illustrates a schematic diagram of a side-ported MMI-based 1×16 power splitter device according to an embodiment of the invention.

The significance of the improvement in throughput of an MMI-based 1×2 splitter with side-porting as provided by the embodiments of the invention compared with conventional end-porting devices can be demonstrated by the side-ported MMI-based 1×16 power splitter device 201 shown in FIG. 8, which comprises an input guide 230 with a half-S-bend (with individual parts not shown) connected to one of fifteen side-ported MMI 1×2 power splitters 233. The MMI 1×2 power splitters 233 are configured in four rows of 1, 2, 4, and 8 power splitters in the respective rows. A row of two intermediate straight guides 234 connects to a second row of power splitters 233. A row of four intermediate straight guides 235 connects the second row of power splitters 233 to a third row of power splitters 233. A row of eight intermediate straight guides 236 connects the third row of power splitters 233 to a fourth row of power splitters 233. Furthermore, a row of sixteen output guides with half-S-bends 237 also connects to the fourth row of power splitters 233. Each of the respective MMI regions 203 is configured with one slanted side input guide 230 and a plurality (preferably two) of slanted side output guides 231.

First, it is noted that there are no intermediate S-bends in the respective rows of guides, 234, 235, 236, 237, which significantly decreases the design and fabrication complexity and improves the overall device performance (due to the drawbacks of S-bends as previously described), compared to the conventional 1×16 power splitter device 31 of FIG. 4.

Second, it is noted that the light must proceed through four layers of splitting from a single input guide 230 to the sixteen output guides 237 of FIG. 8. If the 1×2 splitters are end-ported, then the throughput is $(95\%)^4=81\%$. However, if they are side-ported, then the throughput is $(98\%)^4=92\%$. Moreover, some signal distribution architectures require much more splitting: 1×64 or even 1×256. The throughput improvement of side-porting over end-porting becomes overwhelming for such devices: 87% instead of 70% for 1×64 devices, and 83% instead of 63% for 1×256 devices.

Figure 9:
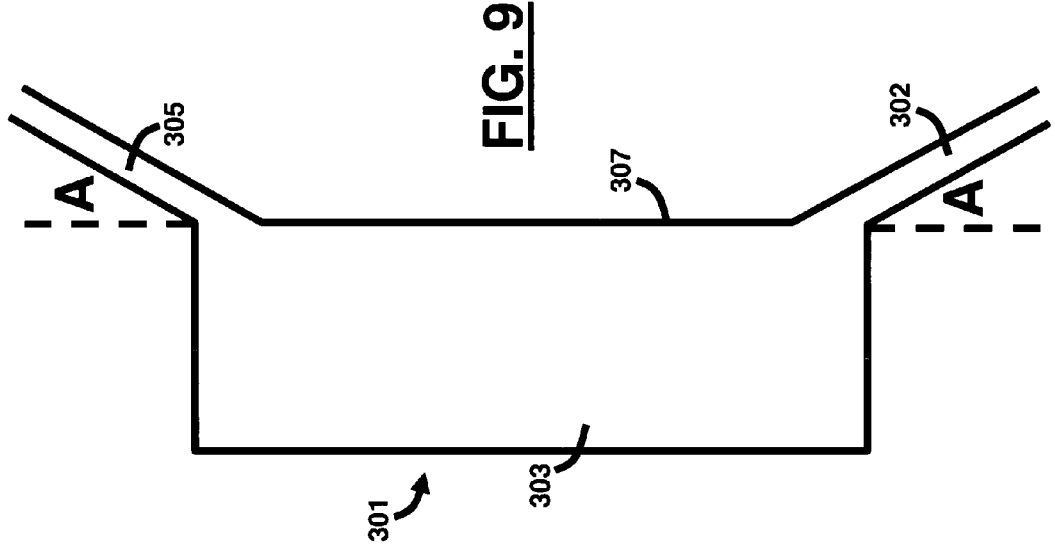
FIG. 9 illustrates a schematic diagram of a side-ported MMI-based turner device according to an embodiment of the invention.

FIG. 9 shows a side-ported MMI-based turner device 301 according to an alternate embodiment of the invention. The device 301 comprises a side-ported MMI region 303, which is set to form an even-numbered self-image, and connects to a straight input guide 302 configured at an acute angle A to the longitudinal axis of the MMI region 303 and connecting either partly or entirely to the lateral side 307 of the MMI region 303. A straight output guide 305 also connects to the MMI region 303, and is also configured at an acute angle A to the longitudinal axis of the MMI region 303 and connecting either partly or entirely to the lateral side 307 of the MMI region 303 and on the same side as the input guide 302. The configuration of the device 301 allows the waveguide direction to be changed without the need for any curved waveguide sections. Preferably, the length of the MMI region 303 is set to twice the self-image length, and the output is in the opposite lateral direction from the input.

Figure 10:
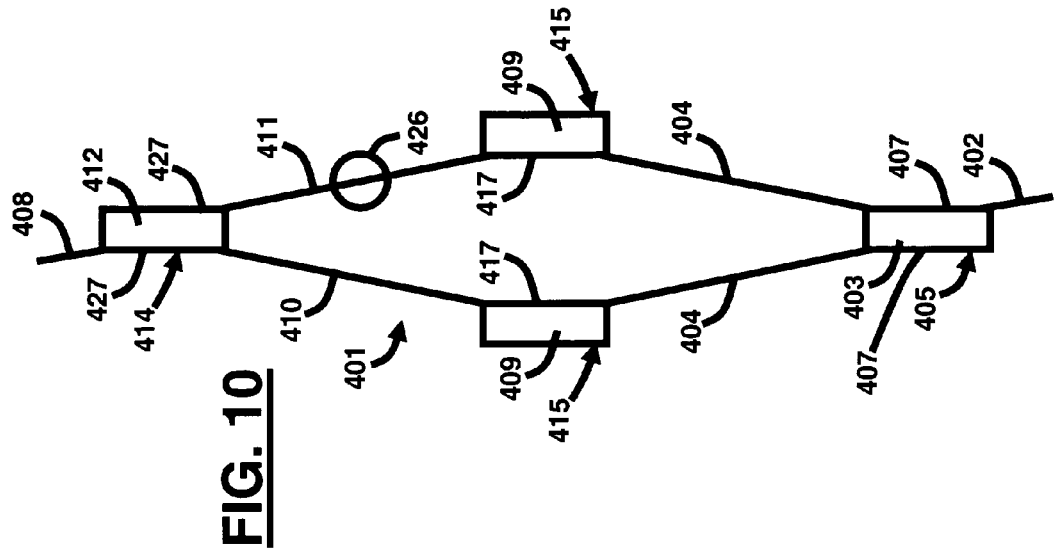
FIG. 10 illustrates a schematic diagram of a side-ported MMI-based Mach-Zehnder interferometer device according to an embodiment of the invention.

FIG. 10 illustrates a side-ported MMI-based Mach-Zehnder Interferometer (MZI) device 401 according to another embodiment of the invention, wherein the MZI device 401 comprises a straight input guide 402 connecting either partly or entirely to the lateral side 407 of a MMI region 403 of a side-ported MMI 1×2 power splitter 405. Two side-ported MMI turners 415 each comprising an MMI region 409, connect to the MMI 1×2 power splitter 405 via two straight guides 404 connecting either partly or entirely to the lateral sides 407 of the MMI region 403 and the lateral sides 417 of the MMI regions 409. A side-ported MMI 1×2 power combiner 414 comprising a MMI region 412 connects to the MMI turners 415 via a first straight guide 410 serving as a reference leg and a second straight guide 411 serving as a sensing leg. Furthermore, the second straight guide (sensing leg) 411 connects to a phase-changing device 426, and both the first and second straight guides 410, 411 connect either partly or entirely to the lateral sides 417 of the MMI regions 409 and the sides 427 of the MMI region 412. Additionally, a straight output guide 408 connects either partly or entirely to the lateral side 427 of the MMI region 412. FIG. 10 shows how the MMI turners 415 can be combined with side-ported 1×2 splitter/combiners 405, 414 and a phase-changing device 426 to make a MZI device 401 that requires no S-bend sections. This MZI device 401, which requires no S-bend sections, is favorably comparable to the conventional device 21 of FIG. 3, which does require four S-bend sections 27, which inherently has disadvantages as previously described.

Figure 11A:
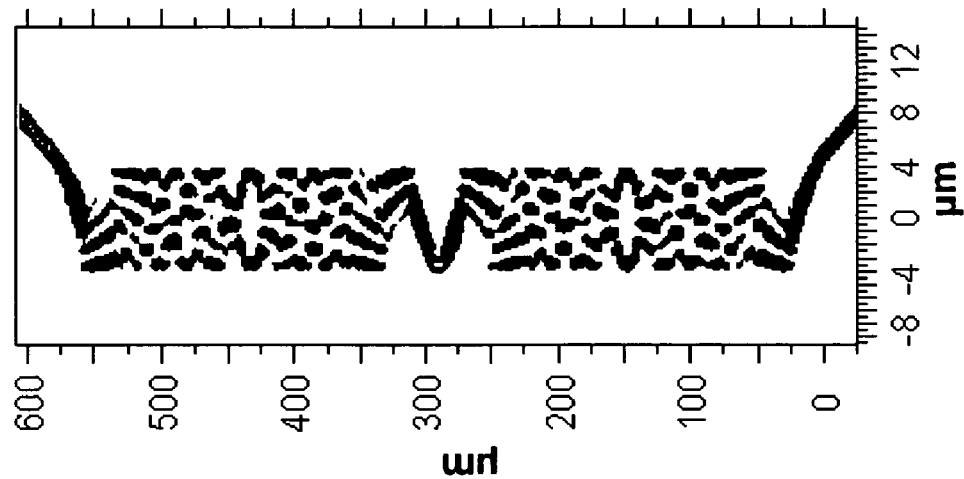
FIG. 11(A) illustrates a graph of the EM field evolution through a side-ported MMI-based turner for a device with n=3, air boundaries, $\lambda$=MMI width=8 μm, and input/output guide width=2 μm according to an embodiment of the invention.
Figure 11B:
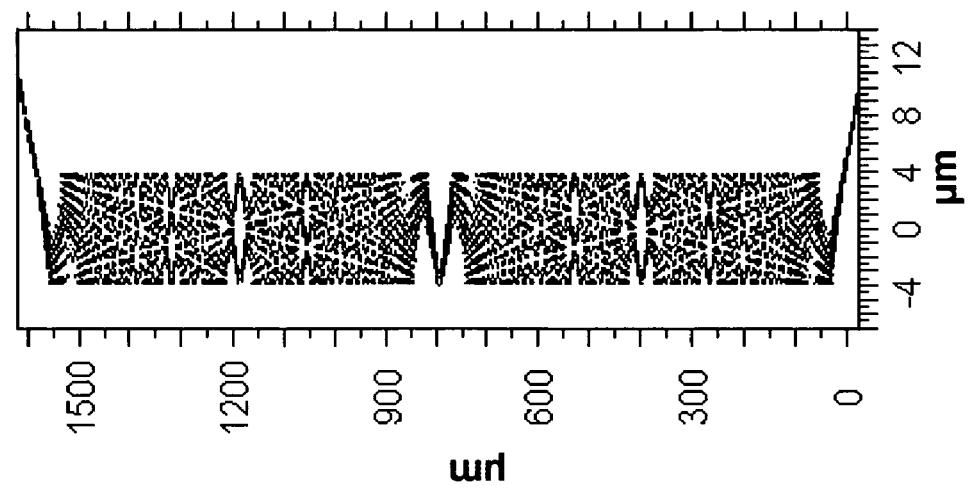
FIG. 11(B) illustrates a graph of the EM field evolution through a side-ported MMI-based turner for a device with n=1.5, air boundaries, $\lambda=1.5$ μm, MMI width=8 μm, and input/output guide width=2 μm according to an embodiment of the invention.

FIGS. 11(A) and 11(B) illustrate top views of the calculated EM field evolution through the side-ported MMI-based turner device 301 of FIG. 9. FIG. 11(A) illustrates the results for a device with n=3, air boundaries, $\lambda=1$ μm, MMI width=8 μm, and input/output guide width=2 μm. FIG. 11(B) illustrates the results for a device with n=1.5, air boundaries, $\lambda=1.5$ μm, MMI width=8 μm, and input/output guide width=2 μm. The relative intensities are shown, on a scale of white (i.e., no shade) for zero intensity to black (i.e., shade) for maximum intensity. Both designs of FIGS. 11(A) and 11(B) achieved greater than 95% throughput with no optimization except length and were each designed and optimized in only 30 minutes. In FIGS. 11(A) and 11(B), the first self-image and two 1×2 splitting positions are clearly visible within the MMI region (i.e., MMI region 303 of FIG. 9).

Figure 12:
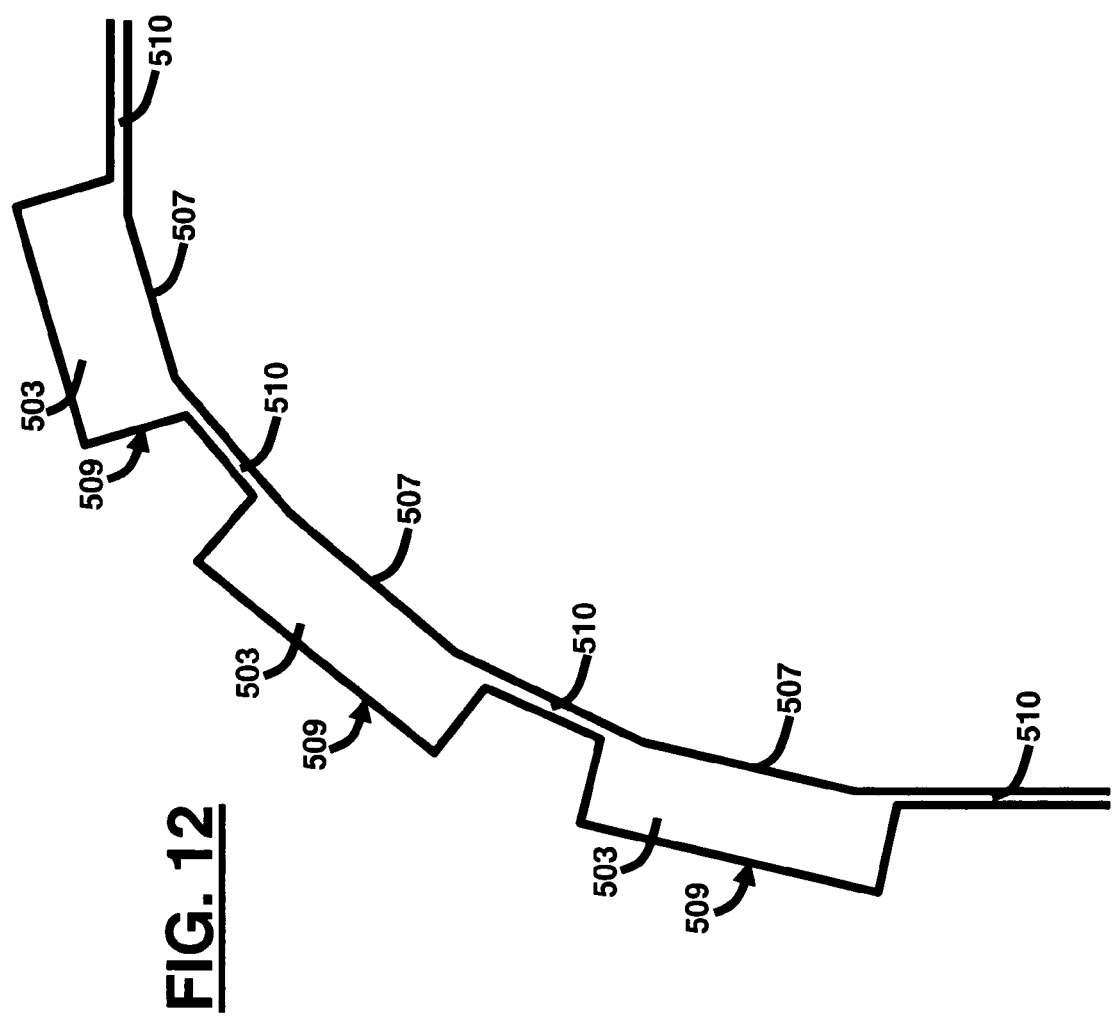
FIG. 12 illustrates a schematic diagram of a large-angle turn accomplished with no curved guides by concatenating several small-angle side-ported MMI turners according to an embodiment of the invention.

The turners 415 of FIG. 10 have other uses besides MZI devices. For example, FIG. 12 shows how a large-angle turn can be accomplished without using curved waveguides by concatenating several small-angle side-ported MMI turners 509. As shown in FIG. 12, the input/output ports 510 are straight (i.e., not curved) and are connected to the lateral sides 507 of the MMI regions 503 of the MMI turners 509.

Figure 13:
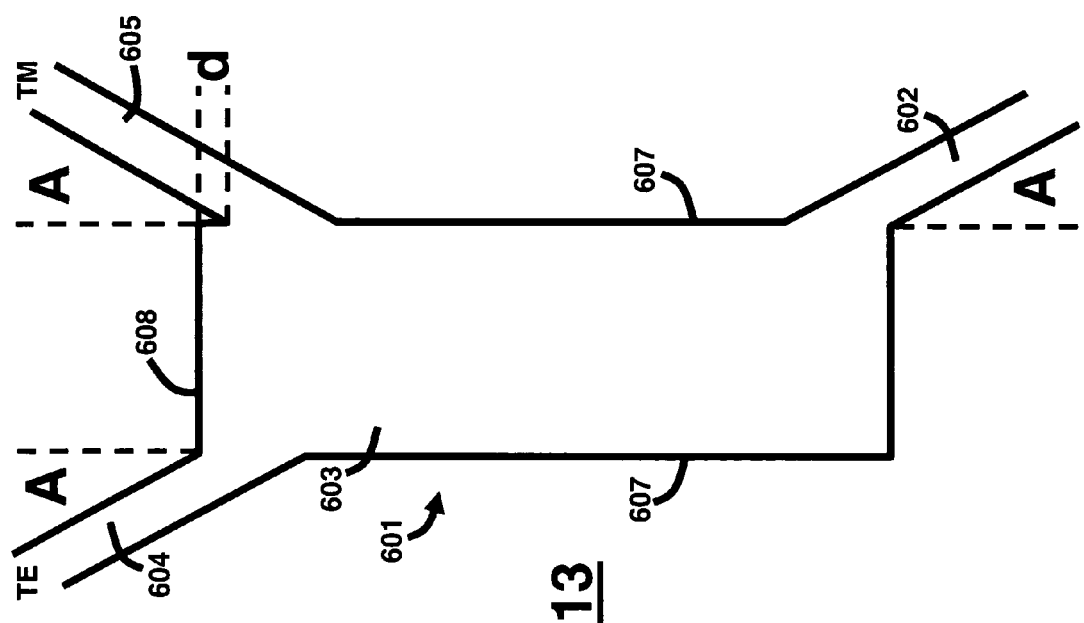
FIG. 13 illustrates a schematic diagram of a side-ported MMI-based SCWP device according to an embodiment of the invention.

According to the embodiments of the invention, the input and output guides of the various embodiments may be offset along the longitudinal axis from the ends of the respective MMI regions and/or from each other. Three examples are shown in FIGS. 13 through 17. FIG. 13 illustrates a schematic top view of the side-ported MMI-based SCWP device 601 that comprises a side-ported MMI region 603 connected to a straight input guide 602, which is configured at an acute angle A to the longitudinal axis of the MMI region 603 and connecting either partly or entirely to the lateral side 607 of the MMI region 603. Also connected to the MMI region 603 is (1) a first straight output guide 604 for one polarization or wavelength, TE, configured at an acute angle A to the longitudinal axis of the MMI region 603 and connecting either partly or entirely to the lateral side 607 of the MMI region 603 and (2) a second straight output guide 605 for the other polarization or wavelength, TM, configured at an acute angle A to the longitudinal axis of the MMI region 603 and connecting either partly or entirely to the side 607 of the MMI region 603, and which may be offset from the other output guide 604 by a distance, d, relative to the end 608 of the MMI region 603.

In the device shown in FIG. 13, both polarizations (wavelengths) enter the MMI region 603 from the input guide 602. One polarization (wavelength) (for example TE) is self-imaged onto one output guide 604, and the other polarization (wavelength) (for example TM) is self-imaged on to the other output guide 605. The process also operates in reverse. The ability to offset one output guide 605 relative to the other output guide 604 enables the device 601 to be configured shorter in length and to perform better than the conventional end-ported SCWP devices, such as the conventional device 1 shown in FIG. 1. Even if a conventional end-ported SCWP device were designed with slanted input/output guides to eliminate the need for S-bends (not shown in FIG. 1), this extra design freedom of offsetting an output guide would still not be available in the conventional structure. Furthermore, as previously mentioned, slanted end-porting performs less well than side-porting.

FIGS. 14(A) and 14(B) present results for an example of a side-ported SCWP device (similar to the device 601 of FIG. 13) with a wavelength splitter that separates pump light ($\lambda$=0.98 μm) from signal light ($\lambda$=1.55 μm). A top view of the calculated EM field evolution with n=1.5, air boundaries, MMI width=8 μm, d=14 μm, and input/output guide width=2 μm. FIG. 14(A) shows the pump and FIG. 14(B) shows the signal. In the devices shown in FIGS. 14(A) and 14(B), the offset d is applied to the left-hand output guide, rather than the right-hand guide 605 as is indicated in FIG. 13. The relative intensities are shown, on a scale of white (i.e., no shade) for zero intensity to black (i.e., shade) for maximum intensity. The throughput of the signal is 95%, with 1% crosstalk of pump light into the signal output. The MMI length and signal output guide offset were optimized (i.e., the values were varied so that the calculated signal throughput was maximized and the calculated pump crosstalk was minimized).

Figure 15:
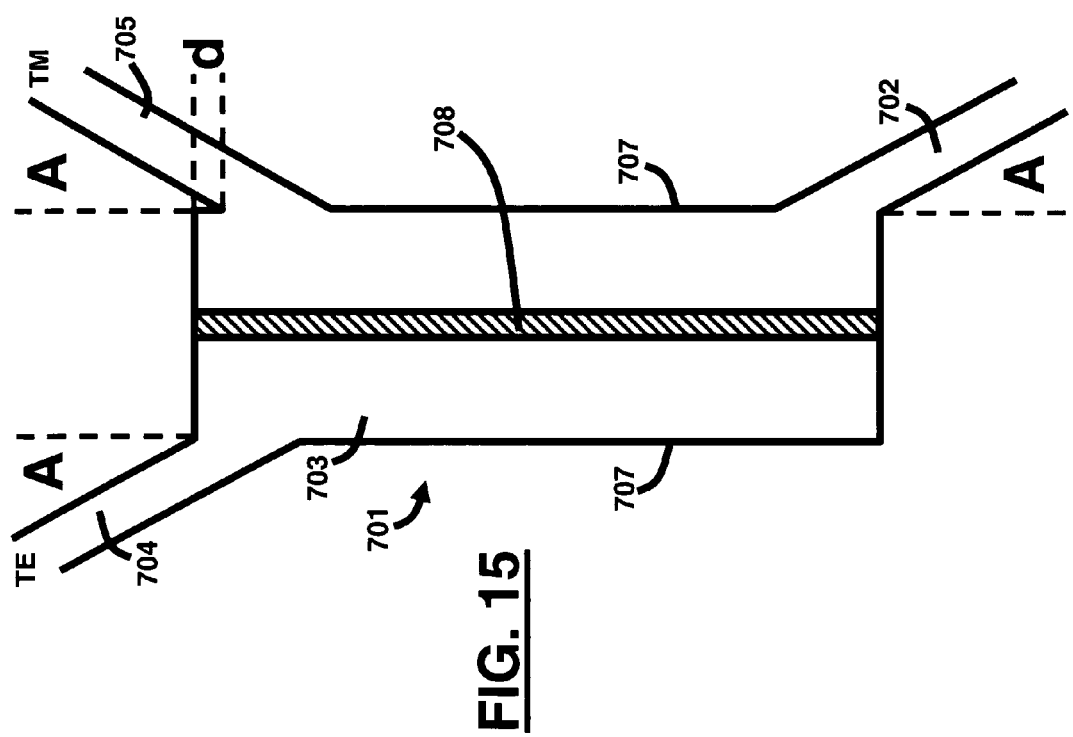
FIG. 15 illustrates a schematic diagram of a side-ported slotted MMI-based switch according to an embodiment of the invention.

Generally, side-porting is compatible with other conventional MMI devices and techniques. FIGS. 15 and 16 illustrate an example of this compatibility. FIG. 15 shows a schematic top view (not to scale) of a side-ported version of a slotted MMI-based switch 701 comprising a side-ported MMI region 703 connected to a straight input guide 702 configured at an acute angle A to the longitudinal axis of the MMI region 703 and connecting either partly or entirely to the lateral side 707 of the MMI region 703. Also connected to the MMI region 703 is (1) a first straight output guide 704 for the "slot off" condition configured at an acute angle A to the longitudinal axis of the MMI region 703 and connecting either partly or entirely to the lateral side 707 of the MMI region 703; and (2) a second straight output guide 705 for the "slot on" condition configured at an acute angle A to the longitudinal axis of the MMI region 703 and connecting either partly or entirely to the lateral side 707 of the MMI region 703, and which may be offset from the other output guide 704 by a distance, d. Moreover, a slot 708 is configured in the MMI region 703, wherein the slot 708 can be turned on and off in the following manner. In the "slot off" condition, light exits the MMI region 703 on the opposite lateral side 704 from the input guide 702. In the "slot on" condition, light exits the MMI region 703 through the second straight output guide 705 on the same lateral side 707 as the input guide 702.

The input guide 702 and output guides 704, 705 are angled so signal separation can be achieved without using S-bends. The input guide 702 and output guides 704, 705 are positioned out of the way of (i.e., without interfering with) the slot 708, eliminating one design constraint. For conventional end-porting, the input/output guide(s) and the slot must generally all fit together within the width of the MMI region. This tends to limit the widths of the guides and the slot, because overlapping the guides and slots causes problems with throughput and crosstalk. However, wider input/output guides are generally preferred, and wider slots can be better for some applications. Also, one might want to use multiple slots spaced at particular lateral distances throughout the width of the MMI region, which severely limits input/output guide width for conventional end-porting.

FIGS. 16(A) and 16(B) illustrate top views of the calculated EM field evolution through the side-ported slotted MMI-based switch 701 of FIG. 15 with n=1.5 (including the slot), air boundaries, $\lambda$=1.5 μm, MMI width=16.1 μm, slot width=0.3 μm, d=8.7 μm, and input/output guide width=2 μm. The "slot off" condition is shown in FIG. 16(A) and the "slot on" condition is shown in FIG. 16(B). The relative intensities are shown, on a scale of white (i.e., no shade) for zero intensity to black (i.e., shade) for maximum intensity. The "slot off" case produced 95.5% throughput, and the "slot on" case produced 95.0% throughput, with less than 0.1% crosstalk for both cases. In these designs, the length, slot index, and output guide offset were optimized in a manner as previously described.

Figure 17:
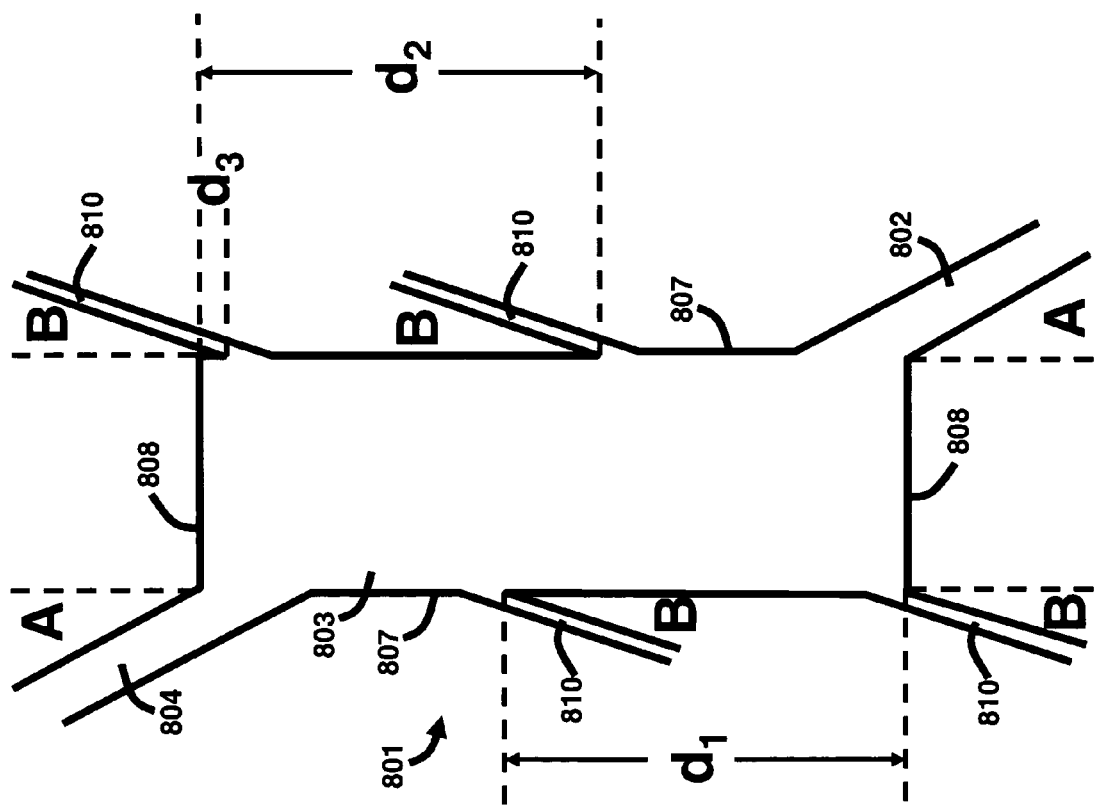
FIG. 17 illustrates a schematic diagram of a more-generalized side-ported MMI-based device according to an embodiment of the invention.

FIG. 17 depicts a schematic top view of a more-generalized side-ported MMI-based device 801 according to another embodiment of the invention, which comprises a side-ported MMI region 803 connected to (1) a straight input guide 802 (which may be the output of a previous device) configured at an acute angle A to the longitudinal axis of the MMI region 803 and connecting either partly or entirely to the lateral side 807 of the MMI region 803; (2) a straight output guide 804 (which may serve as input for subsequent devices) configured at an acute angle A to the longitudinal axis of the MMI region 803 and connecting either partly or entirely to the lateral side 807 of the MMI region 803; and (3) a plurality of smaller straight input or output guides 810 configured at an acute angle B to the longitudinal axis of the MMI region 803 connecting to the lateral sides 807 of the MMI region 803, offset by various distances, $d_1$, $d_2$, and $d_3$, from the ends 808 of the MMI region 803, and configured with a width possibly differing from the width of the input guide 802 and output guide 804.

The device 801 could be used to optically amplify a signal. In this regard, the signal would enter through the input guide 802 and exit through the output guide 804 after an odd number of self-image lengths. Pump light could be introduced via the narrow side guides (ports) 810, which would be positioned at the top and bottom and at intermediate self-images of the signal (on the side laterally opposite the self-image). The field strength of the signal is near zero at the positions of the pump ports 810 so that they do not interfere with the propagation of the signal. In this example, a number of design freedoms are assumed; whereby the input/output guides 802, 804, 810 are not all the same width. Moreover, the guides 802/804, 810 do not intersect the MMI region at the same angle. Furthermore, there are multiple ports, not simply one input and two outputs. Additionally, there are several different offsets, $d_1$, $d_2$, and $d_3$. However, even this example does not exhaust all of the design freedoms made available by side-porting, and is only meant to illustrate the possibilities.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A multimode interference device for coupling electromagnetic radiation comprising:
    a multimode interference region having a longitudinal axis that is substantially parallel to the overall direction of electromagnetic wave propagation through the multimode interference region and having at least one side portion that is substantially parallel to said longitudinal axis;
    a plurality of ports connected to said at least one side portion of said multimode interference region;
    wherein said plurality of ports are positioned at an acute angle with respect to said longitudinal axis of said multimode interface region; and
    wherein said plurality of ports are offset relative to one another.

2. The multimode interference device of claim 1, wherein said plurality of ports comprise:
    at least one input port adapted to receive any of optical power, optic wavelengths, and electromagnetic polarizations; and
    at least one output port adapted to dispatch said any of optical power, optic wavelengths, and electromagnetic polarizations.

3. The multimode interference device of claim 2, wherein said multimode interference region is adapted to direct said any of optical power, optical wavelengths, and electromagnetic polarizations from said at least one input port into said at least one output port.

4. The multimode interference device of claim 2, further comprising a phase-changing device connected to one of said at least one input port and said at least one output port.

5. The multimode interference device of claim 2, wherein said at least one input port is operatively connected to said at least one output port.

6. The multimode interference device of claim 1, wherein said plurality of ports are offset relative to an end portion of said multimode interference region, wherein said end portion of said multimode interference region is substantially transverse to said longitudinal axis of said multimode interference region.

7. The multimode interference device of claim 1, wherein said multimode interference region comprises at least one subregion having an effective refractive index running longitudinally within said multimode interference region.

8. The multimode interference device of claim 7, wherein said at least one subregion comprises a slot.

* * * * *